(12) United States Patent
Inagaki

(10) Patent No.: US 11,928,909 B2
(45) Date of Patent: Mar. 12, 2024

(54) DETERMINATION DEVICE, CONTROL METHOD FOR DETERMINATION DEVICE, DETERMINATION SYSTEM, CONTROL METHOD FOR DETERMINATION SYSTEM, AND PROGRAM

(71) Applicant: DAI NIPPON PRINTING CO., LTD., Tokyo-to (JP)

(72) Inventor: Kouji Inagaki, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 365 days.

(21) Appl. No.: 17/283,990

(22) PCT Filed: Jun. 16, 2020

(86) PCT No.: PCT/JP2020/023629
§ 371 (c)(1),
(2) Date: Apr. 9, 2021

(87) PCT Pub. No.: WO2020/255971
PCT Pub. Date: Dec. 24, 2020

(65) Prior Publication Data
US 2021/0350523 A1    Nov. 11, 2021

(30) Foreign Application Priority Data
Jun. 21, 2019    (JP) .................................. 2019-115787

(51) Int. Cl.
*G06K 9/00*    (2022.01)
*G06T 7/00*    (2017.01)
(Continued)

(52) U.S. Cl.
CPC ............. *G07D 7/12* (2013.01); *G06T 7/0004* (2013.01); *G06T 7/90* (2017.01); *G07D 7/128* (2013.01)

(58) Field of Classification Search
CPC ............. H04N 1/00838; H04N 1/0084; H04N 1/00843; H04N 1/00846;
(Continued)

(56) References Cited

U.S. PATENT DOCUMENTS 5,920,645 A * 7/1999 Aida ........................ G06T 7/11
358/518
6,272,248 B1 * 8/2001 Saitoh ...................... G07D 7/12
382/218
(Continued)

FOREIGN PATENT DOCUMENTS

| CN | 107527422 A | 12/2017 |
|---|---|---|
| JP | 2017-215739 A | 12/2017 |
| WO | 2015/022872 A1 | 2/2015 |

OTHER PUBLICATIONS

May 16, 2022 Search Report issued in European Patent Application No. 20826445.7.
(Continued)

*Primary Examiner* — Atiba O Fitzpatrick
(74) *Attorney, Agent, or Firm* — Oliff PLC

(57) ABSTRACT

A determination device selects a determination area included in a captured image acquired by an imaging data acquisition device, extracts a determination image of a preset target color from the selected determination area, binarizes gradation data of the target color in pixel regions constituting the extracted determination image by using a binarization threshold suitable for each determination area to acquire binarized reference binary data of the determination image, converts the gradation data of the target color in the pixel regions constituting the extracted determination image with respect to a dark portion of the determination image to acquire converted gradation data, binarizes the acquired converted gradation data by using the binarization threshold to acquire comparison binary data, and acquires, based on (Continued)

DIFFERENCE DATA comparing the reference binary data with the comparison binary data, a determination value for determining a printing method used to produce a printed surface of a printed product.

24 Claims, 8 Drawing Sheets

(51) Int. Cl.
 *G06T 7/90* (2017.01)
 *G07D 7/12* (2016.01)
 *G07D 7/128* (2016.01)

(58) Field of Classification Search
 CPC ......... G06T 2207/30176; G06T 7/0002; G06T 2207/30124; G06T 2207/30168; G06T 7/001; G06T 2207/20224; G06T 7/74; G06T 7/11; G06T 2207/10024; G06T 7/90; G06T 7/136; G06T 7/155; G06T 7/187; G06T 2207/30144; G06V 10/50; G06V 10/56
 See application file for complete search history.

(56) References Cited

U.S. PATENT DOCUMENTS

| | | | | |
|---|---|---|---|---|
| 2007/0136213 | A1* | 6/2007 | Sansone | G07B 17/00661 705/401 |
| 2010/0195894 | A1* | 8/2010 | Lohweg | G07D 7/2016 382/135 |
| 2014/0369569 | A1* | 12/2014 | Wicker | G06T 7/001 283/85 |
| 2015/0221077 | A1* | 8/2015 | Kawabata | G06T 7/337 382/141 |
| 2017/0039724 | A1* | 2/2017 | Yanagiuchi | G06V 30/224 |
| 2017/0308744 | A1* | 10/2017 | Gaubatz | G07D 7/1205 |

OTHER PUBLICATIONS

Aug. 25, 2020 Search Report issued in International Patent Application No. PCT/JP2020/023629.

Dec. 1, 2023 Office Action issued in Chinese Patent Application No. 202080005296.X.

* cited by examiner

LOUPE PHOTOGRAPHY

AREA COVERAGE MODULATION (BLUE)

DETERMINATION IMAGE

BINARIZATION

BINARIZATION

ENLARGEMENT, REDUCTION, AND BINARIZATION

ENLARGEMENT, REDUCTION, AND BINARIZATION

DIFFERENCE DATA

DETERMINATION DEVICE, CONTROL METHOD FOR DETERMINATION DEVICE, DETERMINATION SYSTEM, CONTROL METHOD FOR DETERMINATION SYSTEM, AND PROGRAM

TECHNICAL FIELD

Embodiments of the present disclosure relate to a determination device that determines a printing method used to produce a printed product. Embodiments of the present disclosure also relate to a control method for the determination device, a determination system, a control method for the determination system, and a program.

BACKGROUND ART

Hitherto, it has been necessary to accurately determine the authenticity of a printed product, namely, a voucher such as a bill or a gift certificate, or an identification card such as a driver's license, a basic resident registration card, a residence card, a special permanent resident certificate, or a passport.

For example, PTL 1 discloses a related-art technique for detecting a difference in the color flatness of a scanned image of an object that is printed with a printer based on an area coverage modulation method such as inkjet printing and determining whether the printed product is one printed using the area coverage modulation method.

However, this related-art technique requires an image captured in close proximity by using a line sensor such as a scanner, and has a problem such as failing to perform determination using an image produced by an image sensor such as a digital camera.

CITATION LIST

Patent Literature

PTL 1: Japanese Unexamined Patent Application Publication No. 2017-215739

DISCLOSURE OF INVENTION

It is an object of embodiments of the present disclosure to provide a determination device, a control method for the determination device, a determination system, a control method for the determination system, and a program, which can effectively address the aforementioned problems.

An embodiment of the present disclosure provides a determination system including an imaging data acquisition device that captures an image of a printed surface of a printed product to acquire imaging data of the captured image, and a determination device that determines, based on the imaging data acquired by the imaging data acquisition device, a printing method used to produce the printed surface of the printed product for which the image is captured by the imaging data acquisition device. The determination device selects a determination area included in the captured image from the imaging data acquired by the imaging data acquisition device, extracts a determination image of a preset target color from the selected determination area, binarizes gradation data of the target color in a plurality of pixel regions constituting the extracted determination image by using as a reference a binarization threshold suitable for each determination area to acquire binarized reference binary data of the determination image, converts the gradation data of the target color in the plurality of pixel regions constituting the extracted determination image with respect to a dark portion of the determination image to acquire converted gradation data, binarizes the acquired converted gradation data by using as a reference the binarization threshold to acquire comparison binary data, acquires, based on a comparison result obtained by comparing the reference binary data with the comparison binary data, a determination value for determining a printing method used to produce the printed surface of the printed product, and determines, based on the acquired determination value, a printing method used to produce the printed surface of the printed product.

In the determination system according to the embodiment of the present disclosure, the determination device may acquire difference data as the comparison result, the difference data being a difference between the reference binary data and the comparison binary data, and acquire the determination value, based on the difference data that is the acquired comparison result.

In the determination system according to the embodiment of the present disclosure, the determination device may perform conversion processing on the gradation data of the target color in the plurality of pixel regions constituting the extracted determination image so as to enlarge a dark portion of the determination image to acquire enlargement-converted gradation data, perform conversion processing on the enlargement-converted gradation data in the plurality of pixel regions constituting the extracted determination image so as to reduce the dark portion of the determination image in size to acquire reduction-converted gradation data, and binarize the reduction-converted gradation data by using as a reference the binarization threshold to acquire the comparison binary data.

In the determination system according to the embodiment of the present disclosure, the determination device may perform conversion processing on the plurality of pixel regions constituting the determination image so as to replace the gradation data of the target color with a minimum value of a neighboring pixel region of a pixel region so that the dark portion of the determination image is enlarged to acquire the enlargement-converted gradation data, and perform conversion processing on the plurality of pixel regions constituting the determination image so as to replace the enlargement-converted gradation data with a maximum value of the neighboring pixel region of the pixel region so that the dark portion of the determination image is reduced in size to acquire the reduction-converted gradation data.

In the determination system according to the embodiment of the present disclosure, the determination device may perform conversion processing on the gradation data of the target color in the plurality of pixel regions constituting the extracted determination image so as to reduce a dark portion of the determination image in size to acquire reduction-converted gradation data, perform conversion processing on the reduction-converted gradation data in the plurality of pixel regions constituting the extracted determination image so as to enlarge the dark portion of the determination image to acquire enlargement-converted gradation data, and binarize the enlargement-converted gradation data by using as a reference the binarization threshold to acquire the comparison binary data.

In the determination system according to the embodiment of the present disclosure, the determination device may perform conversion processing on the plurality of pixel regions constituting the determination image so as to replace the gradation data of the target color with a maximum value of a neighboring pixel region of a pixel region so that the dark portion of the determination image is reduced in size to acquire the reduction-converted gradation data, and perform conversion processing on the plurality of pixel regions constituting the determination image so as to replace the reduction-converted gradation data with a minimum value of the neighboring pixel region of the pixel region so that the dark portion of the determination image is enlarged to acquire the enlargement-converted gradation data.

In the determination system according to the embodiment of the present disclosure, the binarization threshold suitable for each determination area may be determined based on a histogram of gradation data in the determination area.

In the determination system according to the embodiment of the present disclosure, the determination device may set the number of difference dots per area of the difference data as the determination value.

In the determination system according to the embodiment of the present disclosure, the determination device may determine, based on the acquired determination value, whether the printed product is a printed product printed by a printing method using a plate or a printed product printed by a printing method using a printer based on an area coverage modulation method.

In the determination system according to the embodiment of the present disclosure, the determination device may determine that the printed product is a printed product printed with the printer in a case where the determination value is greater than or equal to a preset determination threshold, and determine that the printed product is a printed product printed with the plate in a case where the determination value is less than the determination threshold.

In the determination system according to the embodiment of the present disclosure, the printing method using the printer may be printing using an area coverage modulation method.

In the determination system according to the embodiment of the present disclosure, the printer based on the area coverage modulation method may print a determination image using a mixture of three colors of CYM (cyan, yellow, and magenta).

In the determination system according to the embodiment of the present disclosure, the imaging data acquisition device may be a mobile phone or a digital camera including an image sensor that acquires the imaging data of an imaging image of the printed surface of the printed product.

In the determination system according to the embodiment of the present disclosure, the printed product may be an original that is printed with the plate, or the printed product may be a counterfeit that is printed with the printer, and the determination device may determine, based on the acquired determination value, whether the printed product is an original printed product printed by the printing method using a plate or a counterfeit printed product printed by the printing method using a printer.

In the determination system according to the embodiment of the present disclosure, the determination device may receive the imaging data acquired by the imaging data acquisition device via the Internet.

In the determination system according to the embodiment of the present disclosure, the determination device may transmit a determination result of a printing method used to produce the printed surface of the printed product to an external device via the Internet.

In the determination system according to the embodiment of the present disclosure, the determination device may transmit a determination result of a printing method used to produce the printed surface of the printed product to the imaging data acquisition device via the Internet.

An embodiment of the present disclosure provides a control method for a determination system including an imaging data acquisition device that captures an image of a printed surface of a printed product to acquire imaging data of the captured image, and a determination device that determines, based on the imaging data acquired by the imaging data acquisition device, a printing method used to produce the printed surface of the printed product for which the image is captured by the imaging data acquisition device. The control method includes, by the determination device, selecting a determination area included in the captured image from the imaging data acquired by the imaging data acquisition device, extracting a determination image of a preset target color from the selected determination area, binarizing gradation data of the target color in a plurality of pixel regions constituting the extracted determination image by using as a reference a binarization threshold suitable for each determination area to acquire binarized reference binary data of the determination image, converting the gradation data of the target color in the plurality of pixel regions constituting the extracted determination image with respect to a dark portion of the determination image to acquire converted gradation data, binarizing the acquired converted gradation data by using as a reference the binarization threshold to acquire comparison binary data, acquiring, based on a comparison result obtained by comparing the reference binary data with the comparison binary data, a determination value for determining a printing method used to produce the printed surface of the printed product, and determining, based on the acquired determination value, a printing method used to produce the printed surface of the printed product.

An embodiment of the present disclosure provides a determination device to be used in a determination system including an imaging data acquisition device that captures an image of a printed surface of a printed product to acquire imaging data of the captured image, for determining, based on the imaging data acquired by the imaging data acquisition device, a printing method used to produce the printed surface of the printed product for which the image is captured by the imaging data acquisition device. The determination device selects a determination area included in the captured image from the imaging data acquired by the imaging data acquisition device, extracts a determination image of a preset target color from the selected determination area, binarizes gradation data of the target color in a plurality of pixel regions constituting the extracted determination image by using as a reference a binarization threshold suitable for each determination area to acquire binarized reference binary data of the determination image, converts the gradation data of the target color in the plurality of pixel regions constituting the extracted determination image with respect to a dark portion of the determination image to acquire converted gradation data, binarizes the acquired converted gradation data by using as a reference the binarization threshold to acquire comparison binary data, acquires, based on a comparison result obtained by comparing the reference binary data with the comparison binary data, a determination value for determining a printing method used to produce the printed surface of the printed product, and determines, based on the acquired determination value, a printing method used to produce the printed surface of the printed product.

An embodiment of the present disclosure provides a control method for a determination device to be used in a determination system including an imaging data acquisition device that captures an image of a printed surface of a printed product to acquire imaging data of the captured image, for determining, based on the imaging data acquired by the imaging data acquisition device, a printing method used to produce the printed surface of the printed product for which the image is captured by the imaging data acquisition device. The control method includes, by the determination device, selecting a determination area included in the captured image from the imaging data acquired by the imaging data acquisition device, extracting a determination image of a preset target color from the selected determination area, binarizing gradation data of the target color in a plurality of pixel regions constituting the extracted determination image by using as a reference a binarization threshold suitable for each determination area to acquire binarized reference binary data of the determination image, converting the gradation data of the target color in the plurality of pixel regions constituting the extracted determination image with respect to a dark portion of the determination image to acquire converted gradation data, binarizing the acquired converted gradation data by using as a reference the binarization threshold to acquire comparison binary data, acquiring, based on a comparison result obtained by comparing the reference binary data with the comparison binary data, a determination value for determining a printing method used to produce the printed surface of the printed product, and determining, based on the acquired determination value, a printing method used to produce the printed surface of the printed product.

An embodiment of the present disclosure provides a program to be executed by a determination device to be used in a determination system including an imaging data acquisition device that captures an image of a printed surface of a printed product to acquire imaging data of the captured image, the determination device including a computer. The program causes the computer to execute processing including, by the determination device, selecting a determination area included in the captured image from the imaging data acquired by the imaging data acquisition device, extracting a determination image of a preset target color from the selected determination area, binarizing gradation data of the target color in a plurality of pixel regions constituting the extracted determination image by using as a reference a binarization threshold suitable for each determination area to acquire binarized reference binary data of the determination image, converting the gradation data of the target color in the plurality of pixel regions constituting the extracted determination image with respect to a dark portion of the determination image to acquire converted gradation data, binarizing the acquired converted gradation data by using as a reference the binarization threshold to acquire comparison binary data, acquiring, based on a comparison result obtained by comparing the reference binary data with the comparison binary data, a determination value for determining a printing method used to produce the printed surface of the printed product, and determining, based on the acquired determination value, a printing method used to produce the printed surface of the printed product.

According to embodiments of the present disclosure, it is possible to determine whether a printed product is a printed product printed by a printing method using a plate or a printed product printed by a printing method using a printer based on an area coverage modulation method such as inkjet printing.

DESCRIPTION OF EMBODIMENTS

Figure 1:
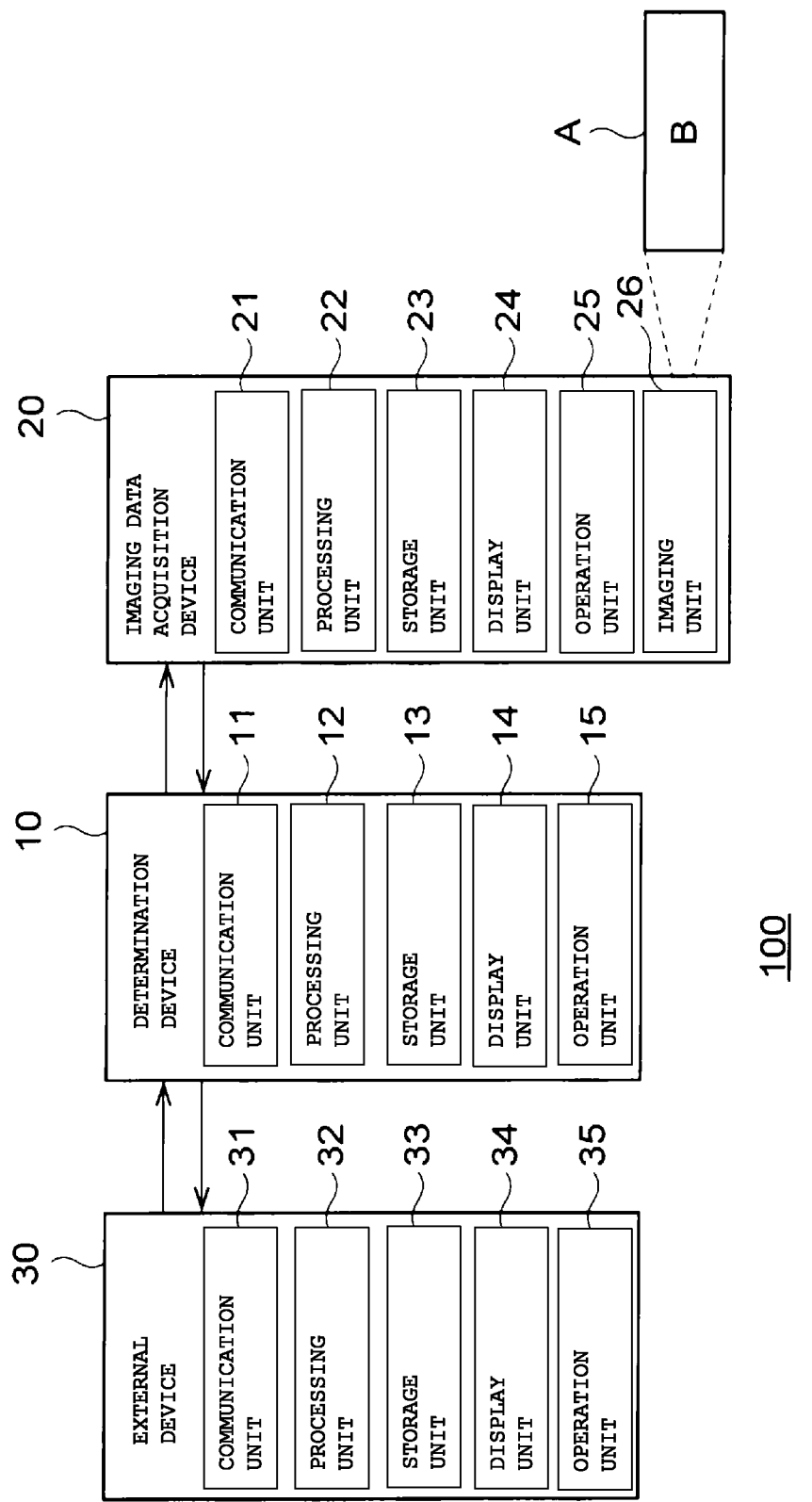
FIG. 1 is a configuration diagram illustrating a configuration of a determination system 100 according to an embodiment.

The following describes a configuration of a determination device and a control method therefor according to embodiments of the present disclosure in detail with reference to the drawings. Embodiments described below are examples of embodiments of the present disclosure, and the present disclosure should not be construed as being limited to these embodiments. As used herein, terms such as "parallel" and "orthogonal", values of length and angle, and the like used to specify shapes and geometric conditions and degrees thereof are not limited to exact meanings, and are construed to the extent that similar functions can be expected. In addition, in the drawings referred to in the embodiments, the same portions or portions having similar functions are assigned the same reference numerals or similar reference numerals, and repeated descriptions thereof are omitted in some cases. In addition, dimensional ratios in the drawings may be different from actual ratios for convenience of description, or a portion of the configuration may be omitted from the drawings.

The following describes an embodiment of the present disclosure with reference to FIGS. 1 to 11B.

Determination System

Figure 2:
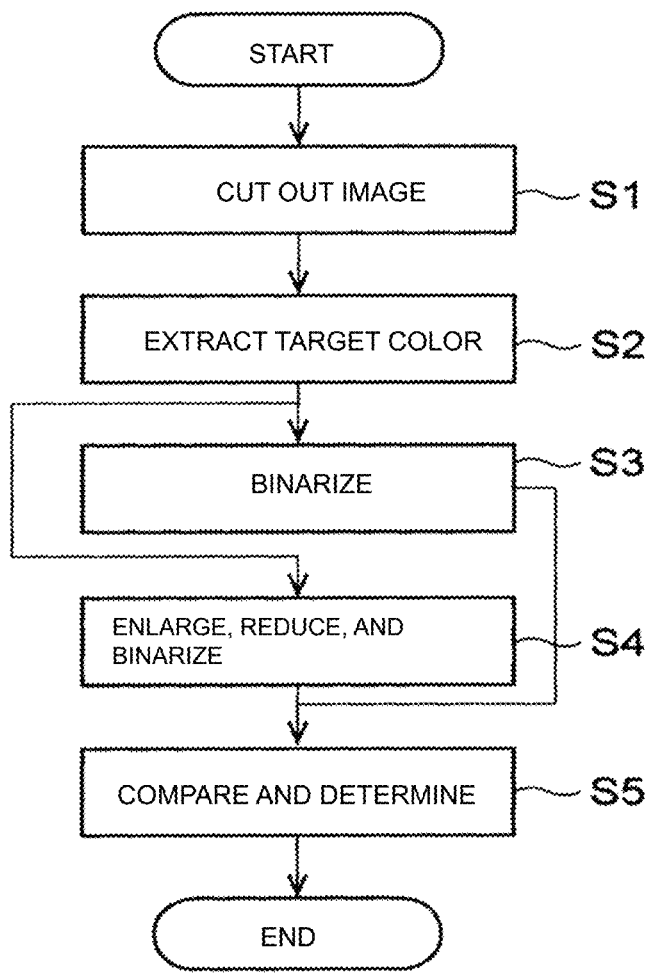
FIG. 2 is a flowchart illustrating an example control method for the determination system 100 (determination device 10) illustrated in FIG. 1.

FIG. 1 is a configuration diagram illustrating a configuration of a determination system 100 according to an embodiment. FIG. 2 is a flowchart illustrating an example control method for the determination system 100 (determination device 10) illustrated in FIG. 1. The process illustrated in FIG. 2 is implemented mainly by a processing unit 12 of the determination device 10 executing a program prepared in advance.

For example, as illustrated in FIG. 1, the determination system 100 includes the determination device 10, an imaging data acquisition device 20, and an external device 30. In the determination system 100 illustrated in FIG. 1, the external device 30 may be omitted as necessary.

Imaging Data Acquisition Device

The imaging data acquisition device 20 is configured to capture an image of a printed surface B of a printed product A and acquire imaging data of the captured image. The imaging data acquired by the imaging data acquisition device 20 is transmitted to the processing unit 12 of the determination device 10 through a communication unit 21 of the imaging data acquisition device 20 and a communication unit 11 of the determination device 10 via wireless communication such as the Internet. The printed product A is, for example, a gift certificate, a bill, a driver's license, a basic resident registration card, a residence card, a special permanent resident certificate, a passport, or the like.

For example, as illustrated in FIG. 1, the imaging data acquisition device 20 includes the communication unit 21, a processing unit 22, a storage unit 23, a display unit 24, an operation unit 25, and an imaging unit 26. The components of the imaging data acquisition device 20 illustrated in FIG. 1 are illustrative, and some of the components may be omitted as necessary, or any other component may be added.

The communication unit 21 is configured to transmit and receive predetermined data and the like to and from the communication unit 11 of the determination device 10 via wireless communication such as the Internet. If necessary, the communication unit 21 may be configured to transmit and receive predetermined data and the like to and from the communication unit 11 via wired communication.

The processing unit 22 is constituted by, for example, a computer such as a CPU and is configured to execute processing necessary for the imaging data acquisition device 20, including control of the operation of the imaging unit 26.

The storage unit 23 stores, for example, a program of processing to be executed by the processing unit 22 of the imaging data acquisition device 20 and data necessary for the processing. The storage unit 23 is configured to temporarily save imaging data generated by the imaging unit 26.

The display unit 24 is, for example, a display that displays content and the like executed by the processing unit 22 of the imaging data acquisition device 20.

The operation unit 25 is, for example, an input device to be operated by the user of the imaging data acquisition device 20, and the imaging data acquisition device 20 is configured to cause the processing unit 22 to execute processing corresponding to the operation.

The imaging unit 26 is configured to capture an image of the printed surface B of the printed product A and acquire imaging data of the captured image. The imaging unit 26 is, for example, an image sensor.

The imaging data acquisition device 20 is, for example, a mobile phone (smartphone) or a digital camera including an image sensor (the imaging unit 26) that acquires imaging data of an imaging image of the printed surface B of the printed product A. The imaging data is, for example, gradation data of RGB colors.

Determination Device

The determination device 10 is configured to determine a printing method used to produce the printed surface B of the printed product A, for which an image is captured by the imaging data acquisition device 20, on the basis of the imaging data acquired by the imaging data acquisition device 20.

For example, as illustrated in FIG. 2, the determination device 10 is configured to select a determination area included in the captured image (cut out an image) from the imaging data acquired by the imaging data acquisition device 20 (step S1 in FIG. 2).

Then, the determination device 10 is configured to extract a determination image L of a preset target color (extract the target color) from the selected determination area (step S2 in FIG. 2).

The determination device 10 extracts a color close to the determination image L of the target color among RGB (such as B (Blue) in the case of cyan), or extracts a color through conversion of CMY (such as 255-R (Red) in the case of cyan) (determines a color to be selected in accordance with the target image or color).

Then, the determination device 10 is configured to binarize gradation data of the target color in a plurality of pixel regions constituting the extracted determination image L by using as a reference a (preset) binarization threshold suitable for each determination area to acquire (calculate) binarized reference binary data of the determination image L (step S3 in FIG. 2).

The binarization threshold suitable for each determination area is determined based on, for example, a histogram of gradation data in the corresponding determination area.

On the other hand, the determination device 10 is configured to convert the gradation data of the target color in the plurality of pixel regions constituting the extracted determination image L with respect to a dark portion (portion of the target color) of the determination image L to acquire (calculate) converted gradation data, and binarize the acquired converted gradation data by using as a reference the binarization threshold described above to acquire (calculate) comparison binary data (step S4 in FIG. 2).

More specifically, in step S4, the determination device 10 is configured to perform conversion processing on the gradation data of the target color in the plurality of pixel regions constituting the extracted determination image L so as to enlarge the dark portion of the determination image L to acquire (calculate) enlargement-converted gradation data (dark portion enlargement processing). Then, the determination device 10 is configured to perform conversion processing on the enlargement-converted gradation data in the plurality of pixel regions constituting the extracted determination image L so as to reduce the size of the dark portion of the determination image L to acquire (calculate) reduction-converted gradation data (dark portion reduction processing). Then, the determination device 10 is configured to binarize the reduction-converted gradation data by using as a reference the binarization threshold described above to acquire (calculate) the comparison binary data described above.

In this case, the determination device 10 is configured to perform conversion processing on the plurality of pixel regions constituting the determination image L so as to replace the gradation data of the target color with a minimum value of a neighboring pixel region of a pixel region so that the dark portion of the determination image L is enlarged to acquire (calculate) the enlargement-converted gradation data.

More specifically, as the dark portion enlargement processing, processing is executed on the target pixel region (target dots) so that the gradation data is replaced with, for example, the minimum value of the neighboring 3×3 region.

In this case, furthermore, the determination device 10 is configured to perform conversion processing on the plurality of pixel regions constituting the determination image L so as to replace the enlargement-converted gradation data with a maximum value of the neighboring pixel region of the pixel region so that the dark portion of the determination image L is reduced in size to acquire (calculate) reduction-converted gradation data.

More specifically, as the dark portion reduction processing, processing is executed on the target pixel region (target dots) so that the gradation data is replaced with, for example, the maximum value of the neighboring 3×3 region.

In still another case, in step S4, the determination device 10 may be configured to perform conversion processing on the gradation data of the target color in the plurality of pixel regions constituting the extracted determination image L so as to reduce the size of the dark portion of the determination image L to acquire (calculate) reduction-converted gradation data (dark portion reduction processing). Then, the determination device 10 may be configured to perform conversion processing on the reduction-converted gradation data in the plurality of pixel regions constituting the extracted determination image L so as to enlarge the dark portion of the determination image L to acquire (calculate) enlargement-converted gradation data (dark portion enlargement processing). Then, the determination device 10 may be configured to binarize the enlargement-converted gradation data by using as a reference the binarization threshold described above to acquire (calculate) the comparison binary data described above.

In this case, the determination device 10 is configured to perform conversion processing on the plurality of pixel regions constituting the determination image L so as to replace the gradation data of the target color with a maximum value of a neighboring pixel region of a pixel region so that the dark portion of the determination image L is reduced in size to acquire (calculate) reduction-converted gradation data.

In this case, furthermore, the determination device 10 is configured to perform conversion processing on the plurality of pixel regions constituting the determination image L so as to replace the reduction-converted gradation data with a minimum value of the neighboring pixel region of the pixel region so that the dark portion of the determination image L is enlarged to acquire (calculate) enlargement-converted gradation data.

After step S4 described above, the determination device 10 is configured to acquire (calculate), based on a comparison result obtained by comparing the reference binary data with the comparison binary data described above, a determination value for determining a printing method used to produce the printed surface B of the printed product A and determine, based on the acquired determination value, a printing method used to produce the printed surface B of the printed product A (step S5 in FIG. 2).

In particular, the determination device 10 is configured to acquire (calculate) difference data, which is a difference between the reference binary data and the comparison binary data, as a comparison result and acquire (calculate) the determination value described above on the basis of the acquired difference data, which is the comparison result.

Then, the determination device 10 is configured to determine, based on the acquired determination value, a printing method used to produce the printed surface B of the printed product A.

In particular, the processing unit 12 of the determination device 10 is configured to determine, based on the acquired determination value, whether the printed product A is a printed product A in which the determination image of the target color is printed with a plate or a printed product A in which the determination image of the target color is printed with a printer.

The determination device may be configured to set, for example, the number of difference dots per area of the difference data as the determination value.

For example, as illustrated in FIG. 1, the determination device 10 includes the communication unit 11, the processing unit 12, a storage unit 13, a display unit 14, and an operation unit 15. The components of the determination device 10 illustrated in FIG. 1 are illustrative, and some of the components may be omitted as necessary, or any other component may be added.

The communication unit 11 is configured to transmit and receive predetermined data and the like to and from the communication unit 21 of the imaging data acquisition device 20 or a communication unit 31 of the external device 30 via wireless communication such as the Internet. If necessary, the communication unit 11 may be configured to transmit and receive predetermined data and the like to and from the communication units 21 and 31 via wired communication.

The display unit 14 is, for example, a display that displays the result of determination executed by the processing unit 12 of the determination device 10.

The operation unit 15 is an input device to be operated by the user of the determination device 10, and the determination device 10 is configured to cause the processing unit 12 to execute processing corresponding to the operation.

The processing unit 12 is constituted by, for example, a computer such as a CPU and is configured to execute processing necessary for the determination device 10.

The processing unit 12 is configured to receive the imaging data acquired by the imaging data acquisition device 20 using the communication unit 11 via the Internet.

The processing unit 12 is configured to, for example, select a determination area included in the captured image from the imaging data acquired by the imaging data acquisition device 20 (step S1 in FIG. 2), extract the determination image L of a preset target color from the selected determination area (step S2 in FIG. 2), binarize gradation data of the target color in a plurality of pixel regions constituting the extracted determination image L by using as a reference a (preset) binarization threshold suitable for each determination area to acquire (calculate) binarized reference binary data of the determination image L (step S3 in FIG. 2), convert the gradation data of the target color in the plurality of pixel regions constituting the extracted determination image L with respect to the dark portion of the determination image L to acquire (calculate) converted gradation data, binarize the acquired converted gradation data by using as a reference the binarization threshold to acquire (calculate) comparison binary data (step S4 in FIG. 2), acquire (calculate), based on a comparison result obtained by comparing the reference binary data with the comparison binary data, a determination value for determining a printing method used to produce the printed surface B of the printed product A, and determine, based on the acquired determination value, a printing method used to produce the printed surface B of the printed product A (step S5 in FIG. 2).

The storage unit 13 stores a program of processing to be executed by the processing unit 12 of the determination device 10 and data necessary for the processing.

The program is a program to be executed by the determination device 10 including at least a computer (the processing unit 12) and is configured to cause the computer (the processing unit 12) to execute processing including selecting a determination area included in the captured image from the imaging data acquired by the imaging data acquisition device 20 (step S1 in FIG. 2), extracting the determination image L of a preset target color from the selected determination area (step S2 in FIG. 2), binarizing gradation data of the target color in a plurality of pixel regions constituting the extracted determination image L by using as a reference a (preset) binarization threshold suitable for each determination area to acquire (calculate) binarized reference binary data of the determination image L (step S3 in FIG. 2), converting the gradation data of the target color in the plurality of pixel regions constituting the extracted determination image L with respect to the dark portion of the determination image L to acquire (calculate) converted gradation data, binarizing the acquired converted gradation data by using as a reference the binarization threshold to acquire (calculate) comparison binary data (step S4 in FIG. 2), acquiring (calculating), based on a comparison result obtained by comparing the reference binary data with the comparison binary data, a determination value for determining a printing method used to produce the printed surface B of the printed product A, and determining, based on the acquired determination value, a printing method used to produce the printed surface B of the printed product A (step S5 in FIG. 2).

For example, if the determination value described above is greater than or equal to a preset determination threshold (the percentage of unevenness in color on the determination image L of the target color is greater than or equal to a predetermined value), the processing unit 12 of the determination device 10 is configured to determine that the printed product A is a printed product printed with the printer described above.

On the other hand, if the determination value described above is less than the determination threshold (the percentage of unevenness in color on the determination image L of the target color is less than the predetermined value), the processing unit 12 of the determination device 10 is configured to determine that the printed product A is a printed product printed with the plate described above.

Then, the processing unit 12 of the determination device 10 is configured to determine, based on the acquired determination value described above, whether the printed product A is an original printed product A printed by a printing method using the plate described above or a counterfeit printed product A printed by a printing method using the printer described above.

Specifically, for example, the determination value described above is calculated from the proportion of the number of difference dots or the like in the comparison of a binarized determination image with respect to the determination area, a determination threshold is calculated from an image of the printed product A on the plate by using the imaging data acquisition device 20, and the printed product A greater than or equal to the determination threshold is determined to be one produced by a printer based on an area coverage modulation method.

Then, the processing unit 12 of the determination device 10 is configured to transmit the determination result of the printing method used to produce the printed surface B of the printed product A to the imaging data acquisition device 20 via the Internet.

The processing unit 12 of the determination device 10 may be configured to transmit the determination result of the printing method used to produce the printed surface B of the printed product A to the external device 30 via the Internet by using the communication unit 11.

External Device

The external device 30 is, for example, a server that executes necessary processing on the basis of the determination result or the like received from the determination device 10.

For example, as illustrated in FIG. 1, the external device 30 includes the communication unit 31, a processing unit 32, a storage unit 33, a display unit 34, and an operation unit 35. The components of the external device 30 illustrated in FIG. 1 are illustrative, and some of the components may be omitted as necessary, or any other component may be added.

The communication unit 31 is configured to transmit and receive predetermined data and the like to and from the communication unit 11 of the determination device 10 via wireless communication such as the Internet. If necessary, the communication unit 31 may be configured to transmit and receive predetermined data and the like to and from the communication unit 11 via wired communication.

The processing unit 32 is constituted by, for example, a computer such as a CPU and is configured to execute processing necessary for the external device 30.

The storage unit 33 stores a program of processing to be executed by the processing unit 32 of the external device 30 and data necessary for the processing.

The display unit 34 is, for example, a display that displays content and the like executed by the processing unit 32 of the external device 30.

The operation unit 35 is an input device to be operated by the user of the external device 30, and the external device 30 is configured to cause the processing unit 32 to execute processing corresponding to the operation.

Basic Principle of Determination Method

The basic principle of the determination method according to this embodiment will now be described. As described above, the determination system 100 according to this embodiment is configured to determine the authenticity of the printed product A, such as a voucher or an identification card, by determining whether the printed product A is a printed product A printed by a printing method using a plate or a printed product A printed by a printing method using a printer based on an area coverage modulation method such as inkjet printing.

For example, the printed product A, which is original, is printed with a plate on offset printing or the like.

In contrast, the printed product A, which is counterfeit, is generally manufactured using, for example, imaging data obtained by imaging of the original printed product A using a scanner by printing the printed surface B of the printed product A with a printer based on an area coverage modulation method such as inkjet printing. The printing method using a printer includes, for example, printing using an area coverage modulation method such as inkjet printing, and the like. A printer based on the area coverage modulation method is configured to, for example, print the printed product A using a mixture of three colors of CYM (cyan, yellow, and magenta). That is, the printer based on the area coverage modulation method is configured to print the determination image L using a mixture of three colors of CYM (cyan, yellow, and magenta).

Accordingly, the determination device according to this embodiment determines whether the printed product A is a printed product A printed by a printing method using a plate or a printed product A printed by a printing method using a printer based on an area coverage modulation method such as inkjet printing, and determines the authenticity of a voucher, an identification card, or the like.

Figure 3:
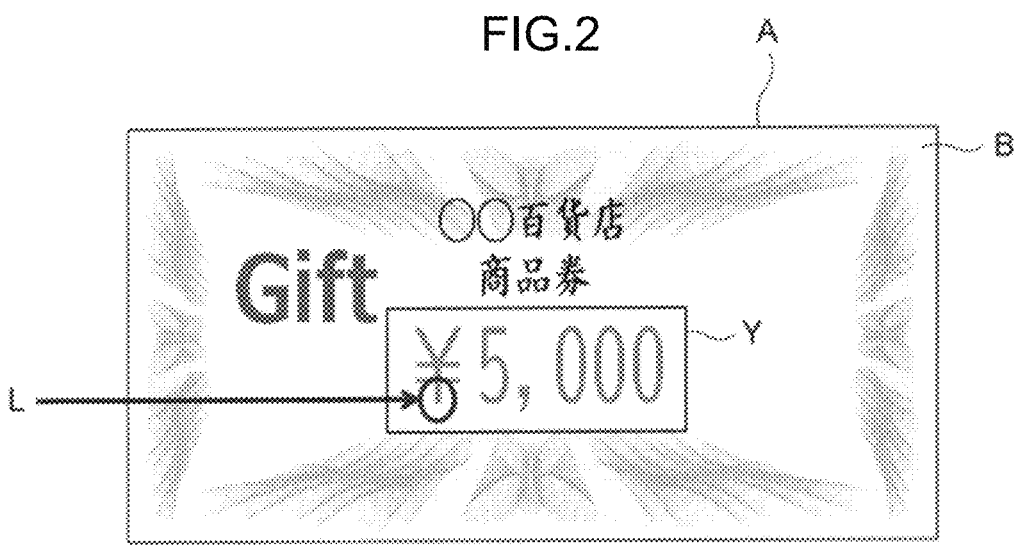
FIG. 3 is a diagram illustrating an example of a printed surface B of a printed product A.
Figure 4A:
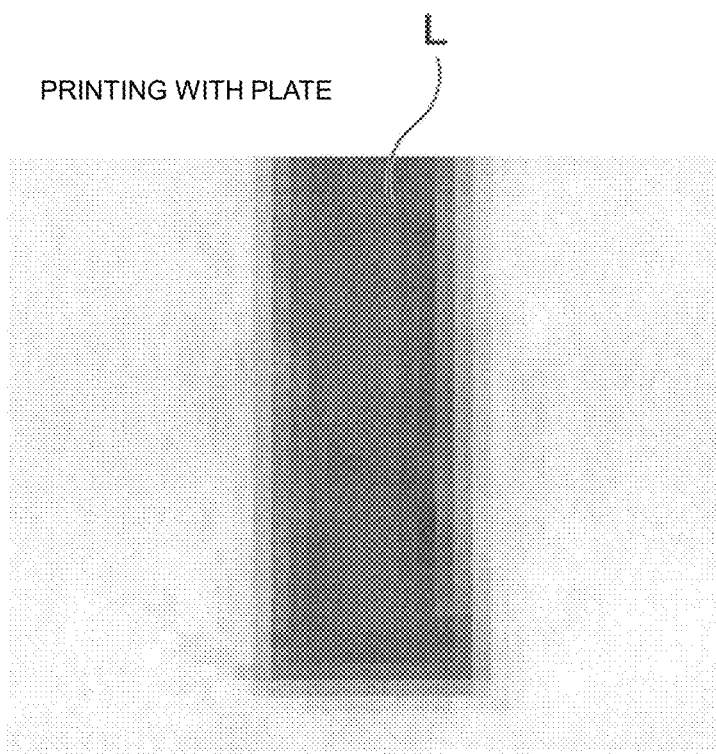
FIG. 4A is an enlarged view of an image L of a target color (blue) in an area Y on the printed surface B of the printed product A illustrated in FIG. 3 when the printed product A is printed with a plate using an offset printing method.
Figure 4B:
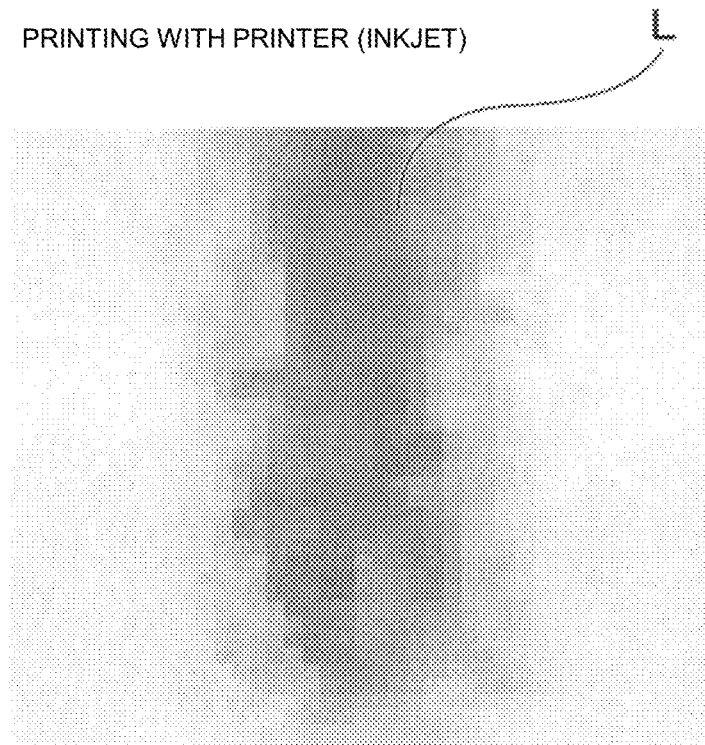
FIG. 4B is an enlarged view of the image (line) L of the target color (blue) in the area Y on the printed surface B of the printed product A illustrated in FIG. 3 when the printed product A is printed with a printer based on an area coverage modulation method.

FIG. 3 is a diagram illustrating an example of the printed surface B of the printed product A. FIG. 4A is an enlarged view of an image L of a target color (blue) in an area Y on the printed surface B of the printed product A illustrated in FIG. 3 when the printed product A is printed with a plate using an offset printing method. FIG. 4B is an enlarged view of the image (line) L of the target color (blue) in the area Y on the printed surface B of the printed product A illustrated in FIG. 3 when the printed product A is printed with a printer based on an area coverage modulation method.

For example, as illustrated in FIG. 3, the printed surface B of the printed product A, which is a gift certificate, includes the area Y having the image L of the target color (for example, blue).

For example, as illustrated in FIG. 4A, when the printed product A is the original printed by a printing method using a plate, such as offset printing, substantially no unevenness in color appears on the image L of the target color in the area Y on the printed surface B of the printed product A.

In contrast, for example, as illustrated in FIG. 4B, when the printed product A is a counterfeit printed by printing with a printer, unevenness in color occurs on the image L of the target color in the area Y on the printed surface B of the printed product A.

A description will now be given of the principle that unevenness in color occurs at end portions of the image L of the target color in the area Y on the printed surface B of the printed product A when the printed product A is a counterfeit printed by printing with a printer.

Figure 5:
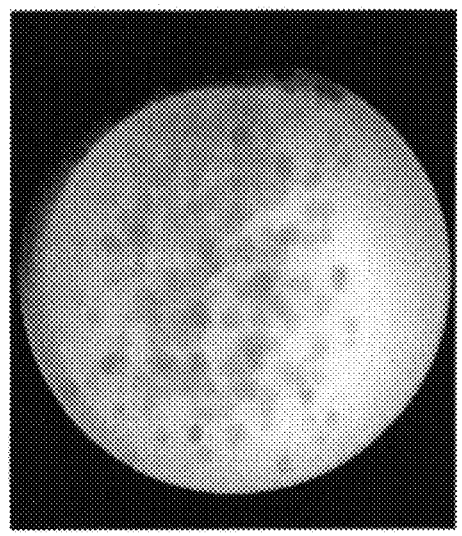
FIG. 5 is a diagram illustrating an example enlarged view of an image of the target color (blue) that is printed using a mixture of three colors of CYM (cyan C, yellow Y, and magenta M) using a printer based on an area coverage modulation method.

FIG. 5 is a diagram illustrating an example enlarged view of an image of the target color (blue) that is printed using a mixture of three colors of CYM (cyan C, yellow Y, and magenta M) using a printer based on an area coverage modulation method, in which the positions of the three colors are printed.

As illustrated in FIG. 5, when a color close to each of the primary colors (such as cyan, yellow, and magenta) is printed using a printer based on an area coverage modulation method such as inkjet printing, dots of each color are sparsely formed, and accordingly unevenness in color (such as voids) is observed in the captured image.

In particular, the printer is configured to perform printing by, for example, scanning a printing unit (a printhead and a paper feed mechanism) by using a driving system (for example, a motor). When during the rendering by the printer, the use of the driving system (motor), such as the paper feed mechanism, such as the paper feed mechanism, causes a fine error, more noticeable unevenness in color occurs in the image of the target color.

Figure 11A:
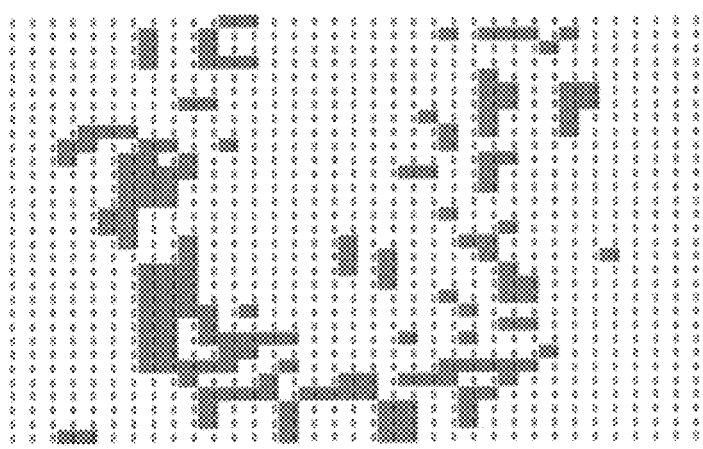
FIG. 11A is a diagram illustrating an example of difference data that is a difference between the reference binary data and the comparison binary data corresponding to the determination image of the target color illustrated in FIG. 10A, when the printed product A is printed with a printer.

In this manner, when the printed product A is a counterfeit printed by printing with a printer based on an area coverage modulation method such as inkjet printing, unevenness in color (such as voids) occurs in the determination image L of the target color (i.e., as illustrated in FIG. 11A described below, the value of difference data is large).

Figure 11B:
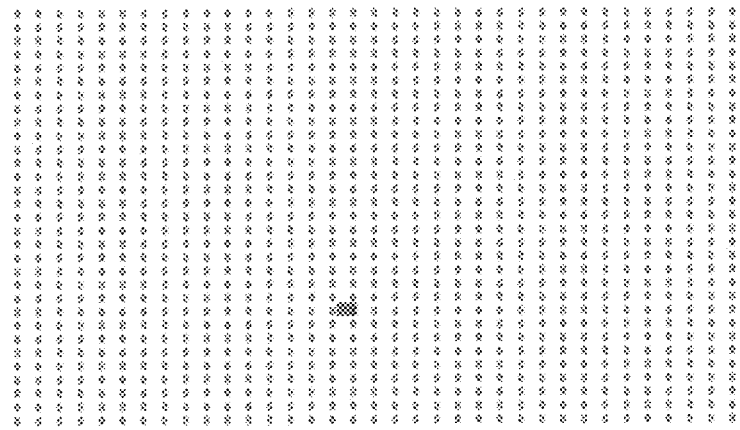
FIG. 11B is a diagram illustrating an example of difference data that is a difference between the reference binary data and the comparison binary data corresponding to the determination image of the target color illustrated in FIG. 10B, when the printed product A is printed with a plate.

In contrast, as described above, when the printed product A is the original printed by a printing method using a plate, no unevenness in color (such as voids) occurs in the determination image L of the target color (i.e., as illustrated in FIG. 11B described below, the value of difference data is small).

In this embodiment, therefore, as described above, it is determined whether the printed product A is a printed product A printed by a printing method using a plate or a printed product A printed by a printing method using a printer based on an area coverage modulation method such as inkjet printing to determine whether the printed product A is original or counterfeit.

As described above, the printing method using a printer is, for example, printing using an area coverage modulation method.

Control Method for Determination System

Next, an example of a control method that is a determination method of the determination system 100, in particular, a control method for a determination device, will be described.

Figure 6:
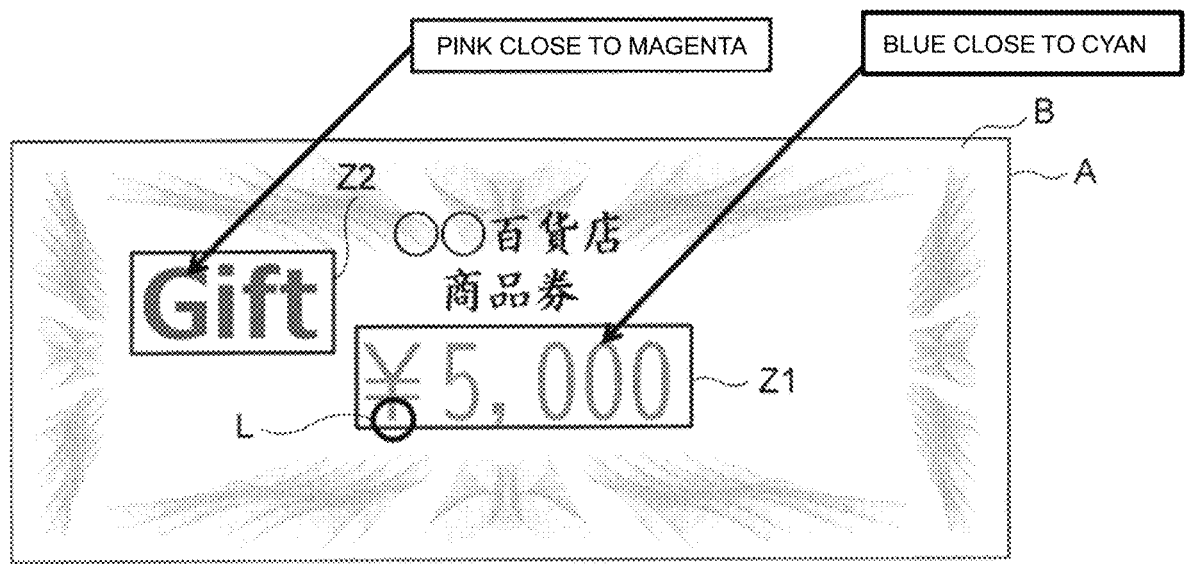
FIG. 6 is a diagram illustrating an example of a plurality of determination areas Z1 and Z2 on the printed surface B of the printed product A.
Figure 7A:
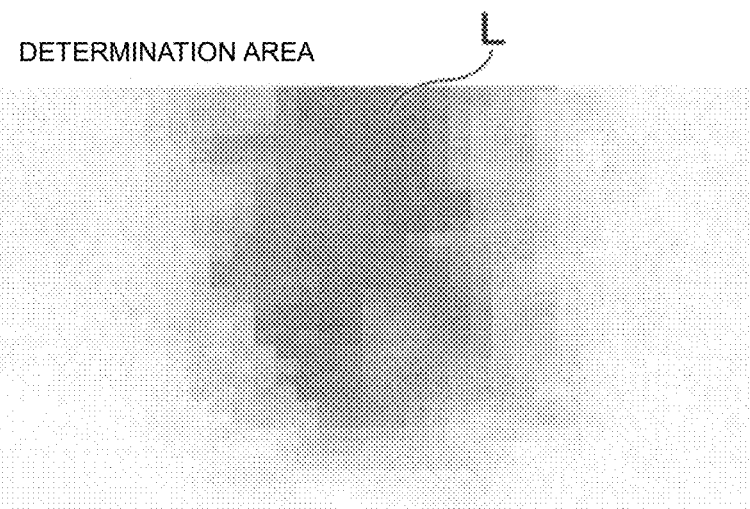
FIG. 7A is a diagram illustrating an example of a determination image of a target color in the selected determination area Z1 on the printed surface B of the printed product A illustrated in FIG. 6 when the printed product A is printed with a printer based on an area coverage modulation method.
Figure 7B:
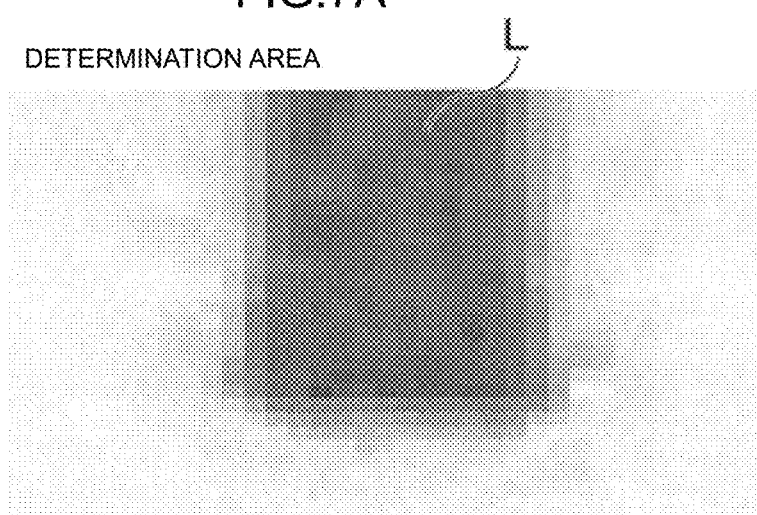
FIG. 7B is a diagram illustrating an example of the determination image of the target color in the selected determination area Z1 on the printed surface B of the printed product A illustrated in FIG. 6 when the printed product A is printed with a plate.
Figure 8A:
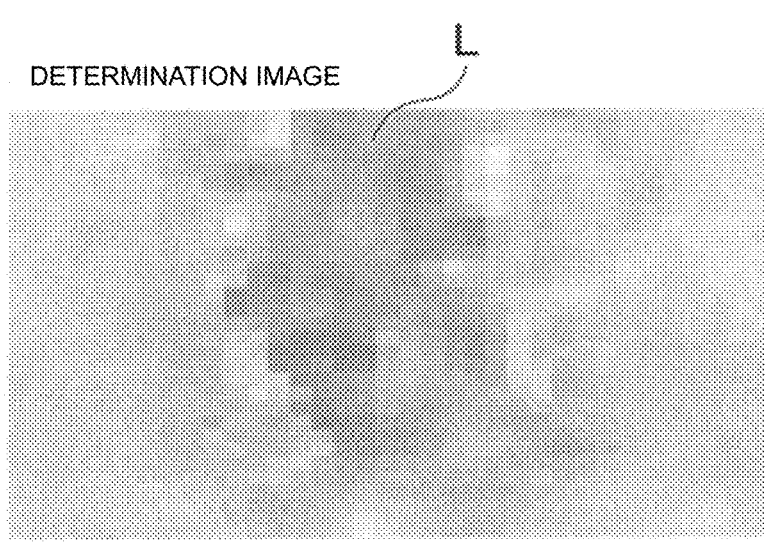
FIG. 8A is an enlarged view of a determination image L illustrated in FIG. 7A in which the target color is extracted when the printed product A is printed with a printer.
Figure 8B:
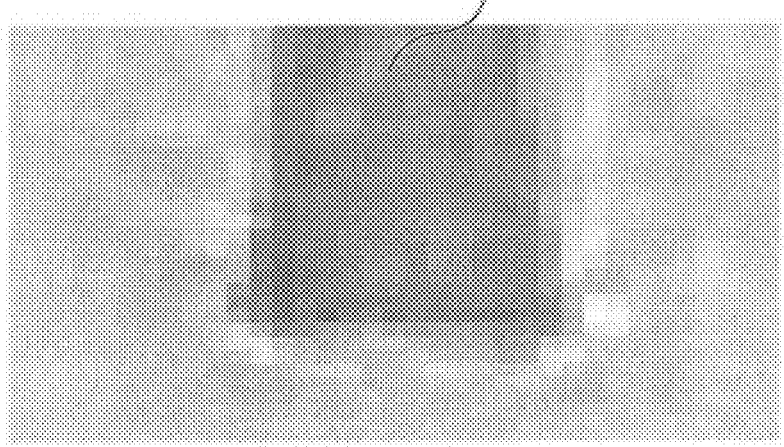
FIG. 8B is an enlarged view of a determination image L illustrated in FIG. 7A in which the target color is extracted when the printed product A is printed with a plate.
Figure 9A:
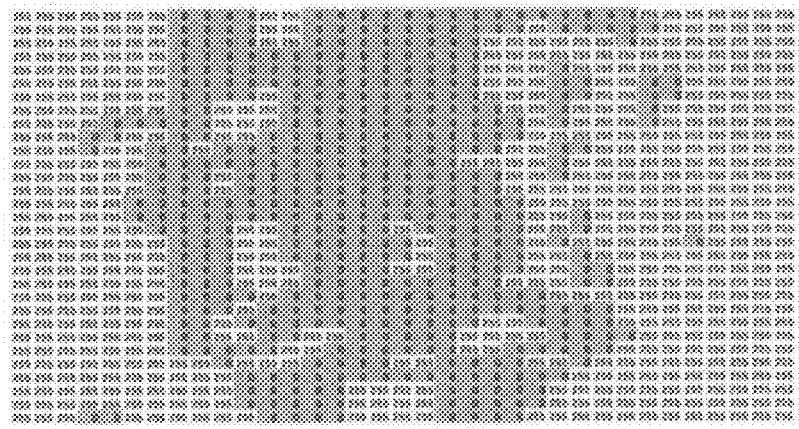
FIG. 9A is a diagram illustrating an example of reference binary data obtained by binarizing gradation data of the target color of the determination image L illustrated in FIG. 8A in which the target color is extracted by using as a reference a binarization threshold when the printed product A is printed with a printer.
Figure 9B:
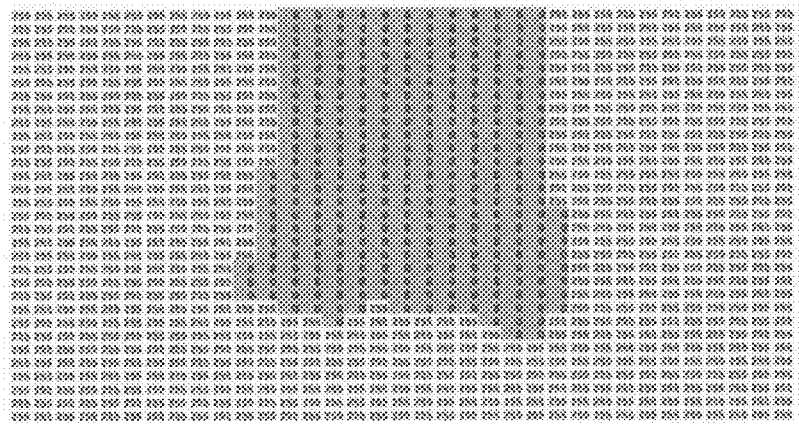
FIG. 9B is a diagram illustrating an example of reference binary data obtained by binarizing gradation data of the target color of the determination image L illustrated in FIG. 8B in which the target color is extracted by using as a reference a binarization threshold when the printed product A is printed with a plate.
Figure 10A:
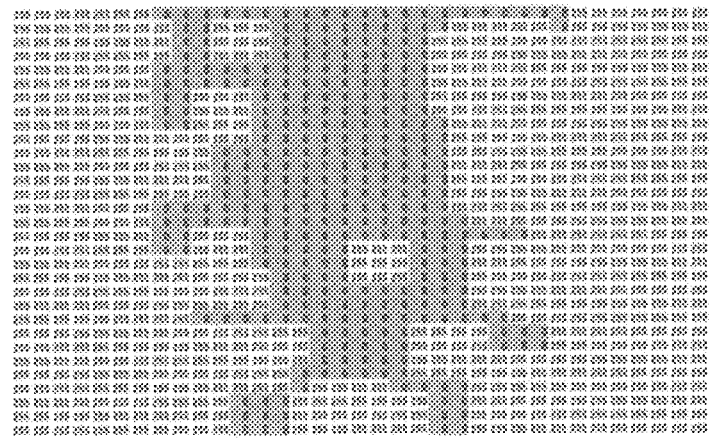
FIG. 10A is a diagram illustrating an example of comparison binary data obtained by binarizing converted gradation data, which is acquired by converting the gradation data of the target color of the determination image L illustrated in FIG. 8A in which the target color is extracted with respect to the target color of the determination image L and then executing enlargement and reduction processing, by using as a reference the binarization threshold when the printed product A is printed with a printer.
Figure 10B:
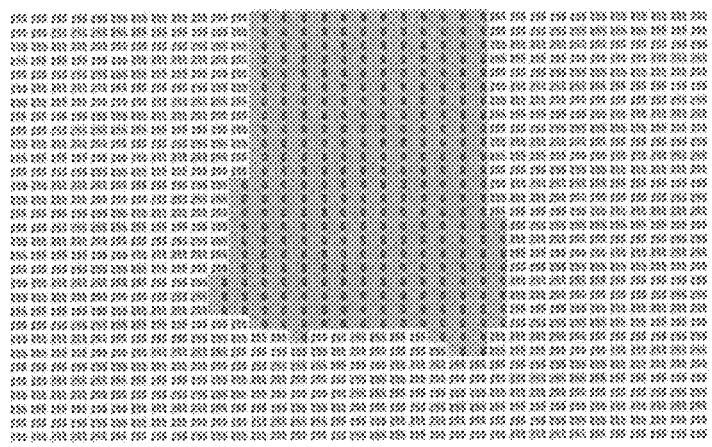
FIG. 10B is a diagram illustrating an example of comparison binary data obtained by binarizing converted gradation data, which is acquired by converting the gradation data of the target color of the determination image L illustrated in FIG. 8B in which the target color is extracted with respect to the target color of the determination image L and then executing enlargement and reduction processing, by using as a reference the binarization threshold when the printed product A is printed with a plate.

FIG. 6 is a diagram illustrating an example of a plurality of determination areas Z1 and Z2 on the printed surface B of the printed product A. FIG. 7A is a diagram illustrating an example of a determination image of a target color in the selected determination area Z1 on the printed surface B of the printed product A illustrated in FIG. 6 when the printed product A is printed with a printer based on an area coverage modulation method. FIG. 7B is a diagram illustrating an example of the determination image of the target color in the selected determination area Z1 on the printed surface B of the printed product A illustrated in FIG. 6 when the printed product A is printed with a plate. FIG. 8A is an enlarged view of the determination image L illustrated in FIG. 7A in which the target color is extracted when the printed product A is printed with a printer. FIG. 8B is an enlarged view of the determination image L illustrated in FIG. 7A in which the target color is extracted when the printed product A is printed with a plate. FIG. 9A is a diagram illustrating an example of reference binary data obtained by binarizing gradation data of the target color of the determination image L illustrated in FIG. 8A in which the target color is extracted by using as a reference a binarization threshold when the printed product A is printed with a printer. FIG. 9B is a diagram illustrating an example of reference binary data obtained by binarizing gradation data of the target color of the determination image L illustrated in FIG. 8B in which the target color is extracted by using as a reference a binarization threshold when the printed product A is printed with a plate. FIG. 10A is a diagram illustrating an example of comparison binary data obtained by binarizing converted gradation data, which is acquired by converting the gradation data of the target color of the determination image L illustrated in FIG. 8A in which the target color is extracted with respect to the target color of the determination image L and then executing enlargement and reduction processing, by using as a reference the binarization threshold when the printed product A is printed with a printer. FIG. 10B is a diagram illustrating an example of comparison binary data obtained by binarizing converted gradation data, which is acquired by converting the gradation data of the target color of the determination image L illustrated in FIG. 8B in which the target color is extracted with respect to the target color of the determination image L and then executing enlargement and reduction processing, by using as a reference the binarization threshold when the printed product A is printed with a plate. FIG. 11A is a diagram illustrating an example of difference data that is a difference between the reference binary data and the comparison binary data corresponding to the determination image of the target color illustrated in FIG. 10A, when the printed product A is printed with a printer. FIG. 11B is a diagram illustrating an example of difference data that is a difference between the reference binary data and the comparison binary data corresponding to the determination image of the target color illustrated in FIG. 10B, when the printed product A is printed with a plate.

For example, as illustrated in FIG. 6, the printed surface B of the printed product A, which is a gift certificate, includes areas Z1 to Z2 each having an image of a target color.

For example, as illustrated in FIGS. 7A and 7B, the processing unit 12 of the determination device 10 selects the determination area Z1 illustrated in FIG. 6, which is included in the captured image, from the imaging data acquired by the imaging data acquisition device 20 (corresponding to step S1 in FIG. 2).

Then, as illustrated in FIGS. 8A and 8B, the processing unit 12 of the determination device 10 extracts the determination image L of a preset target color (blue) (extracts the target color) from the selected determination area Z1 (corresponding to step S2 in FIG. 2).

As described above, the processing unit 12 of the determination device 10 extracts a color close to the determination image L of the target color among RGB (such as B (Blue) in the case of cyan) or extracts a color through conversion of CMY (such as 255-R (Red) in the case of cyan) (determines a color to be selected in accordance with the target image or color).

As illustrated in FIGS. 9A and 9B, the processing unit 12 of the determination device 10 binarizes gradation data of the target color in a plurality of pixel regions constituting the extracted determination image L by using as a reference a (preset) binarization threshold suitable for each determination area to acquire (calculate) binarized reference binary data of the determination image L (corresponding to step S3 in FIG. 2).

In FIGS. 9A and 9B, the area (dark portion) of the target color of the binarized determination image L is represented as gradation data "0", and the area other than the target color is represented as gradation data "255".

As described above, the binarization threshold suitable for each determination area is determined based on, for example, a histogram of gradation data in the corresponding determination area.

On the other hand, as illustrated in FIGS. 10A and 10B, the processing unit 12 of the determination device 10 converts the gradation data of the target color in the plurality of pixel regions constituting the extracted determination image L with respect to the dark portion (portion of the target color) of the determination image L to acquire (calculate) converted gradation data, and binarizes the acquired converted gradation data by using as a reference the binarization threshold described above to acquire (calculate) comparison binary data (corresponding to step S4 in FIG. 2).

More specifically, in step S4, the processing unit 12 of the determination device 10 performs conversion processing on the gradation data of the target color in the plurality of pixel regions constituting the extracted determination image L so as to enlarge the dark portion of the determination image L to acquire (calculate) enlargement-converted gradation data (dark portion enlargement processing). Then, the processing unit 12 of the determination device 10 performs conversion processing on the enlargement-converted gradation data in the plurality of pixel regions constituting the extracted determination image L so as to reduce the size of the dark portion of the determination image L to acquire (calculate) reduction-converted gradation data (dark portion reduction processing). Then, the processing unit 12 of the determination device 10 binarizes the reduction-converted gradation data by using as a reference the binarization threshold described above to acquire (calculate) the comparison binary data described above.

In this case, the processing unit 12 of the determination device 10 performs conversion processing on the plurality of pixel regions constituting the determination image L so as to replace the gradation data of the target color with a minimum value of a neighboring pixel region of a pixel region so that the dark portion of the determination image L is enlarged to acquire (calculate) the enlargement-converted gradation data.

More specifically, as the dark portion enlargement processing, processing is executed on the target pixel region (target dots) so that the gradation data is replaced with, for example, the minimum value of the neighboring 3×3 region.

In this case, furthermore, the processing unit 12 of the determination device 10 performs conversion processing on the plurality of pixel regions constituting the determination image L so as to replace the enlargement-converted gradation data with a maximum value of the neighboring pixel region of the pixel region so that the dark portion of the determination image L is reduced in size to acquire (calculate) reduction-converted gradation data.

More specifically, as the dark portion reduction processing, processing is executed on the target pixel region (target dots) so that the gradation data is replaced with, for example, the maximum value of the neighboring 3×3 region.

In still another case, in step S4, the processing unit 12 of the determination device 10 may be configured to perform conversion processing on the gradation data of the target color in the plurality of pixel regions constituting the extracted determination image L so as to reduce the size of the dark portion of the determination image L to acquire (calculate) reduction-converted gradation data (dark portion reduction processing). Then, the processing unit 12 of the determination device 10 may be configured to perform conversion processing on the reduction-converted gradation data in the plurality of pixel regions constituting the extracted determination image L so as to enlarge the dark portion of the determination image L to acquire (calculate) enlargement-converted gradation data (dark portion enlargement processing). Then, the processing unit 12 of the determination device 10 may be configured to binarize the enlargement-converted gradation data by using as a reference the binarization threshold described above to acquire (calculate) the comparison binary data described above.

In this case, the processing unit 12 of the determination device 10 performs conversion processing on the plurality of pixel regions constituting the determination image L so as to replace the gradation data of the target color with a maximum value of a neighboring pixel region of a pixel region so that the dark portion of the determination image L is reduced in size to acquire (calculate) reduction-converted gradation data.

In this case, furthermore, the processing unit 12 of the determination device 10 performs conversion processing on the plurality of pixel regions constituting the determination image L so as to replace the reduction-converted gradation data with a minimum value of the neighboring pixel region of the pixel region so that the dark portion of the determination image L is enlarged to acquire (calculate) enlargement-converted gradation data.

Then, the processing unit 12 of the determination device 10 determines, based on the acquired determination value, a printing method used to produce the printed surface B of the printed product A.

After step S4 described above, the processing unit 12 of the determination device 10 acquires (calculates), based on a comparison result obtained by comparing the reference binary data with the comparison binary data described above, a determination value for determining a printing method used to produce the printed surface B of the printed product A, and determines, based on the acquired determination value, a printing method used to produce the printed surface B of the printed product A (corresponding to step S5 in FIG. 2).

In particular, as illustrated in FIGS. 11A and 11B, the processing unit 12 of the determination device 10 acquires (calculates) difference data, which is a difference between the reference binary data and the comparison binary data, as a comparison result and acquires (calculates) the determination value described above on the basis of the acquired difference data, which is the comparison result.

For example, if the determination value described above is greater than or equal to a preset determination threshold (i.e., as illustrated in FIGS. 9A, 10A, and 11A, the percentage of unevenness in color on the determination image of the target color is greater than or equal to a predetermined value), the processing unit 12 of the determination device 10 determines that the printed product A is a printed product printed with the printer described above.

On the other hand, if the determination value described above is less than the determination threshold (i.e., as illustrated in FIGS. 9B, 10B, and 11B, the percentage of unevenness in color on the determination image of the target color is less than the predetermined value), the processing unit 12 of the determination device 10 determines that the printed product A is a printed product printed with the plate described above.

In this manner, the determination device 10 determines, based on the acquired determination value, whether the printed product A is an original printed product A printed by a printing method using the plate described above or a counterfeit printed product A printed by a printing method using the printer described above.

The processing unit 12 of the determination device 10 transmits the determination result of the printing method used to produce the printed surface B of the printed product A to the imaging data acquisition device 20 (mobile phone) via the Internet.

The determination result of the printing method used to produce the printed surface B of the printed product A is displayed on the display unit 24 of the imaging data acquisition device 20 (mobile phone), which enables the user of the imaging data acquisition device 20 (mobile phone) to be informed of the determination result.

Alternatively, the processing unit 12 of the determination device 10 may transmit the determination result of the printing method used to produce the printed surface B of the printed product A to the external device 30 via the Internet by using the communication unit 11.

The determination result of the printing method used to produce the printed surface B of the printed product A is displayed on the display unit 34 of the external device 30, which enables the user of the imaging data acquisition device 20 (mobile phone) to be informed of the determination result.

As described above, according to embodiments of the present disclosure, it is possible to determine whether a printed product is a printed product printed by a printing method using a plate or a printed product printed by a printing method using a printer based on an area coverage modulation method such as inkjet printing.

While some modifications of the embodiment described above have been described, it is apparent that a plurality of modifications can be used in combination as appropriate.

REFERENCE SIGNS LIST 100 determination system
10 determination device
20 imaging data acquisition device
30 external device
11 communication unit
12 processing unit
13 storage unit
14 display unit
15 operation unit 21 communication unit
22 processing unit
23 storage unit
24 display unit
25 operation unit
26 imaging unit
31 communication unit
32 processing unit
33 storage unit
34 display unit
35 operation unit

The invention claimed is:

1. A determination system comprising:
an imaging data acquisition device that captures an image of a printed surface of a printed product to acquire imaging data of the captured image; and
a determination device that determines, based on the imaging data acquired by the imaging data acquisition device, a printing method used to produce the printed surface of the printed product for which the image is captured by the imaging data acquisition device,
wherein the determination device
selects a determination area included in the captured image from the imaging data acquired by the imaging data acquisition device,
extracts a determination image of a preset target color from the selected determination area,
binarizes gradation data of the target color in a plurality of pixel regions constituting the extracted determination image by using as a reference a binarization threshold suitable for each determination area to acquire binarized reference binary data of the determination image,
converts the gradation data of the target color in the plurality of pixel regions constituting the extracted determination image with respect to a dark portion of the determination image to acquire converted gradation data,
binarizes the acquired converted gradation data by using as a reference the binarization threshold to acquire comparison binary data,
acquires, based on a comparison result obtained by comparing the reference binary data with the comparison binary data, a determination value for determining a printing method used to produce the printed surface of the printed product, and
determines, based on the acquired determination value, a printing method used to produce the printed surface of the printed product.

2. The determination system according to claim 1, wherein the determination device
acquires difference data as the comparison result, the difference data being a difference between the reference binary data and the comparison binary data, and
acquires the determination value, based on the difference data that is the acquired comparison result.

3. The determination system according to claim 2, wherein the determination device
performs conversion processing on the gradation data of the target color in the plurality of pixel regions constituting the extracted determination image so as to enlarge a dark portion of the determination image to acquire enlargement-converted gradation data,
performs conversion processing on the enlargement-converted gradation data in the plurality of pixel regions constituting the extracted determination image so as to reduce the dark portion of the determination image in size to acquire reduction-converted gradation data, and
binarizes the reduction-converted gradation data by using as a reference the binarization threshold to acquire the comparison binary data.

4. The determination system according to claim 3, wherein the determination device
performs conversion processing on the plurality of pixel regions constituting the determination image so as to replace the gradation data of the target color with a minimum value of a neighboring pixel region of a pixel region so that the dark portion of the determination image is enlarged to acquire the enlargement-converted gradation data, and
performs conversion processing on the plurality of pixel regions constituting the determination image so as to replace the enlargement-converted gradation data with a maximum value of the neighboring pixel region of the pixel region so that the dark portion of the determination image is reduced in size to acquire the reduction-converted gradation data.

5. The determination system according to claim 2, wherein the determination device
performs conversion processing on the gradation data of the target color in the plurality of pixel regions constituting the extracted determination image so as to reduce a dark portion of the determination image in size to acquire reduction-converted gradation data,
performs conversion processing on the reduction-converted gradation data in the plurality of pixel regions constituting the extracted determination image so as to enlarge the dark portion of the determination image to acquire enlargement-converted gradation data, and
binarizes the enlargement-converted gradation data by using as a reference the binarization threshold to acquire the comparison binary data.

6. The determination system according to claim 5, wherein the determination device
performs conversion processing on the plurality of pixel regions constituting the determination image so as to replace the gradation data of the target color with a maximum value of a neighboring pixel region of a pixel region so that the dark portion of the determination image is reduced in size to acquire the reduction-converted gradation data, and
performs conversion processing on the plurality of pixel regions constituting the determination image so as to replace the reduction-converted gradation data with a minimum value of the neighboring pixel region of the pixel region so that the dark portion of the determination image is enlarged to acquire the enlargement-converted gradation data.

7. The determination system according to claim 1, wherein the binarization threshold suitable for each determination area is determined based on a histogram of gradation data in the determination area.

8. The determination system according to claim 2, wherein the determination device
sets the number of difference dots per area of the difference data as the determination value.

9. The determination system according to claim 1, wherein the determination device
determines, based on the acquired determination value, whether the printed product is a printed product printed by a printing method using a plate or a printed product printed by a printing method using a printer based on an area coverage modulation method.

10. The determination system according to claim 9, wherein the determination device
determines that the printed product is a printed product printed with the printer in a case where the determination value is greater than or equal to a preset determination threshold, and
determines that the printed product is a printed product printed with the plate in a case where the determination value is less than the determination threshold.

11. The determination system according to claim 9, wherein the printing method using the printer comprises printing using an area coverage modulation method.

12. The determination system according to claim 11, wherein the printer based on the area coverage modulation method prints a determination image using a mixture of three colors of CYM (cyan, yellow, and magenta).

13. The determination system according to claim 1, wherein the imaging data acquisition device is a mobile phone or a digital camera including an image sensor that acquires the imaging data of an imaging image of the printed surface of the printed product.

14. The determination system according to claim 9, wherein the printed product is an original that is printed with the plate, or
the printed product is a counterfeit that is printed with the printer, and
wherein the determination device
determines, based on the acquired determination value, whether the printed product is an original printed product printed by the printing method using a plate or a counterfeit printed product printed by the printing method using a printer.

15. The determination system according to claim 1, wherein the determination device
receives the imaging data acquired by the imaging data acquisition device via the Internet.

16. The determination system according to claim 1, wherein the determination device
transmits a determination result of a printing method used to produce the printed surface of the printed product to an external device via the Internet.

17. The determination system according to claim 1, wherein the determination device
transmits a determination result of a printing method used to produce the printed surface of the printed product to the imaging data acquisition device via the Internet.

18. A control method for a determination system including
an imaging data acquisition device that captures an image of a printed surface of a printed product to acquire imaging data of the captured image, and
a determination device that determines, based on the imaging data acquired by the imaging data acquisition device, a printing method used to produce the printed surface of the printed product for which the image is captured by the imaging data acquisition device, the control method comprising,
by the determination device:
selecting a determination area included in the captured image from the imaging data acquired by the imaging data acquisition device;
extracting a determination image of a preset target color from the selected determination area;
binarizing gradation data of the target color in a plurality of pixel regions constituting the extracted determination image by using as a reference a binarization threshold suitable for each determination area to acquire binarized reference binary data of the determination image;
converting the gradation data of the target color in the plurality of pixel regions constituting the extracted determination image with respect to a dark portion of the determination image to acquire converted gradation data;
binarizing the acquired converted gradation data by using as a reference the binarization threshold to acquire comparison binary data;
acquiring, based on a comparison result obtained by comparing the reference binary data with the comparison binary data, a determination value for determining a printing method used to produce the printed surface of the printed product; and
determining, based on the acquired determination value, a printing method used to produce the printed surface of the printed product.

19. A determination device to be used in a determination system including an imaging data acquisition device that captures an image of a printed surface of a printed product to acquire imaging data of the captured image, for determining, based on the imaging data acquired by the imaging data acquisition device, a printing method used to produce the printed surface of the printed product for which the image is captured by the imaging data acquisition device, wherein the determination device
selects a determination area included in the captured image from the imaging data acquired by the imaging data acquisition device,
extracts a determination image of a preset target color from the selected determination area,
binarizes gradation data of the target color in a plurality of pixel regions constituting the extracted determination image by using as a reference a binarization threshold suitable for each determination area to acquire binarized reference binary data of the determination image,
converts the gradation data of the target color in the plurality of pixel regions constituting the extracted determination image with respect to a dark portion of the determination image to acquire converted gradation data,
binarizes the acquired converted gradation data by using as a reference the binarization threshold to acquire comparison binary data,
acquires, based on a comparison result obtained by comparing the reference binary data with the comparison binary data, a determination value for determining a printing method used to produce the printed surface of the printed product, and
determines, based on the acquired determination value, a printing method used to produce the printed surface of the printed product.

20. A control method for a determination device to be used in a determination system including an imaging data acquisition device that captures an image of a printed surface of a printed product to acquire imaging data of the captured image, for determining, based on the imaging data acquired by the imaging data acquisition device, a printing method used to produce the printed surface of the printed product for which the image is captured by the imaging data acquisition device, the control method comprising, by the determination device:

selecting a determination area included in the captured image from the imaging data acquired by the imaging data acquisition device;

extracting a determination image of a preset target color from the selected determination area;

binarizing gradation data of the target color in a plurality of pixel regions constituting the extracted determination image by using as a reference a binarization threshold suitable for each determination area to acquire binarized reference binary data of the determination image;

converting the gradation data of the target color in the plurality of pixel regions constituting the extracted determination image with respect to a dark portion of the determination image to acquire converted gradation data;

binarizing the acquired converted gradation data by using as a reference the binarization threshold to acquire comparison binary data;

acquiring, based on a comparison result obtained by comparing the reference binary data with the comparison binary data, a determination value for determining a printing method used to produce the printed surface of the printed product; and determining, based on the acquired determination value, a printing method used to produce the printed surface of the printed product.

21. The determination system according to claim 1, wherein the printed product is a certificate document such as a gift certificate, a bill, a driver's license, a basic resident registration card, a residence card, a special permanent resident certificate, a passport, a voucher, or an identification card.

22. The control method according to claim 18, wherein the printed product is a certificate document such as a gift certificate, a bill, a driver's license, a basic resident registration card, a residence card, a special permanent resident certificate, a passport, a voucher, or an identification card.

23. The determination device according to claim 19, wherein the printed product is a certificate document such as a gift certificate, a bill, a driver's license, a basic resident registration card, a residence card, a special permanent resident certificate, a passport, a voucher, or an identification card.

24. The control method according to claim 20, wherein the printed product is a certificate document such as a gift certificate, a bill, a driver's license, a basic resident registration card, a residence card, a special permanent resident certificate, a passport, a voucher, or an identification card.

\* \* \* \* \*